Patented Oct. 8, 1946

2,408,784

UNITED STATES PATENT OFFICE 2,408,784

ANHYDROUS MONOFLUOROPHOSPHORIC ACID AND METHOD OF PRODUCING IT

Willy Lange and Ralph Livingston, Cincinnati, Ohio, assignors, by direct and mesne assignments, to Ozark Chemical Company, Tulsa, Okla., a corporation of Delaware No Drawing. Application March 11, 1943, Serial No. 478,838

6 Claims. (Cl. 23—139)

Although it has been known that the salts of monofluorophosphoric acid exhibit a similar chemical behavior as do sulfates, forming more or less slightly soluble precipitates with those cations which form insoluble sulfates, all former attempts to prepare the anhydrous or concentrated acid have been unsuccessful, as far as we are aware.

A principal object of our invention therefore is the production of anhydrous or concentrated monofluorophosphoric acid corresponding to the formula $H_2PO_3F$ and the provision of a practical and satisfactory method therefor affording yields which are virtually quantitative.

Essentially our method of producing the anhydrous acid consists in reacting anhydrous hydrofluoric acid (HF) and water-free metaphosphoric acid ($HPO_3$), preferably in substantially stoichiometrically equivalent amounts and at a temperature not exceeding the boiling point of the anhydrous hydrofluoric acid, until a clear liquid is obtained. However, as will presently appear, it is not essential that the reactants be supplied in strictly stoichiometrically equivalent amounts as moderate excess of either may be employed without affecting the ultimate result, but since this practice does not result in the production of a greater quantity of acid and may further lead to loss or wastage of part of or all the excess, under normal conditions the preferred procedure will usually be followed.

The reaction proceeds in accordance with the following equation:

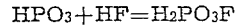

$$HPO_3 + HF = H_2PO_3F$$

when stoichiometrically equivalent amounts of the reactants are used and the resultant product is pure anhydrous monofluorophosphoric acid. It is a clear oily liquid, colorless and odorless, and in appearance resembles concentrated sulfuric acid; however due to hydrolysis by moisture of the air a slight odor of hydrofluoric acid appears after short exposure of the acid thereto. The density of the acid at 25° C. is 1.82. Upon cooling the acid somewhat below —30° C., it congeals to a glass-like mass. The acid is stable when kept for several hours at 150° C. under vacuum. It does not attack glass under anhydrous conditions and when poured into a cold concentrated aqueous solution of silver nitrate, heavy typical colorless crystals identifiable as silver monofluorophosphate ($Ag_2PO_3F$) are produced immediately. These crystals when reacted with methyl iodide form the characteristic ester as described in the literature.

The temperature at which the reaction is carried out may vary from very low ones to the boiling point of anhydrous hydrofluoric acid at reduced, atmospheric or super-atmospheric pressure, the boiling point of this substance at atmospheric pressure being 19° C.

The following are examples of different ways of performing the method of our invention in the production of the acid:

Example I 80 grams of anhydrous metaphosphoric acid are placed in a platinum bottle and cooled to ice temperature; 20 grams of liquid hydrofluoric acid are then added and the bottle sealed, the equipment being so built that anhydrous conditions are maintained. The bottle and contents are then placed in a shaking machine and shaken at room temperature until a homogeneous liquid is obtained with a yield of 100 grams. It will be noted that in this practice chemical equivalents of the ingredients are used. The product when analyzed by analytical methods established in the literature is found to contain P 31.1%; F 18.8% as against the calculated values respectively of 31.0% and 19.0%.

Example II 165.7 grams of water-free metaphosphoric acid are mixed in a closed stainless steel container with 44.3 grams of liquid anhydrous hydrofluoric acid, the container being cooled with water below the boiling point of the latter. The contents of the closed container are then mixed with a mechanical stirrer until a homogeneous liquid results and the container is then evacuated to 3 mm. of mercury and heated to about 50° C. in a water bath for five hours to remove the volatile material. A pure concentrated monofluorophosphoric acid is obtained in a yield of 199.2 grams = 96.3%, the analysis of which gives similar results to those for Example I. It will be observed that in this case the hydrofluoric acid supplied is in slight excess (6.8%) of the stoichiometrically calculated amount. For further verification of the purity of the product, the equivalent weight thereof may be determined by pouring a weighed portion into a known excess of 1 N. NaOH solution and then titrating the excess base with 1 N. HCl to a phenolophthalein end point. The actual value obtained is 49.8 while the theoretical value is 50.

Example III 49.5 grams of water-free metaphosphoric acid and 11.7 grams of liquid anhydrous hydrofluoric acid are placed in a platinum bottle at ice temperature. The sealed bottle is then rotated at room temperature until the liquid becomes clear. Under these conditions the surplus metaphosphoric acid remains undissolved so the liquid may be decanted therefrom and by suitable test proves to be virtually pure concentrated monofluorophosphoric acid. It will be observed that in this case the metaphosphoric acid is supplied in a slight excess (5.4%) over the stoichiometric amount.

The foregoing examples are given by way of illustration only and not in any restrictive or limiting sense since it will be understood that many other ways may be employed in reacting the initially supplied components as long as the essential features of the method are preserved as will be readily apparent to those skilled in the art. Thus water-free metaphosphoric acid may be used as such, or as a mixture with other water-free compounds.

Moreover the reaction vessels employed may be those customarily utilized for similar or analogous operations and may thus be of the usual mixer or rotating drum types, though other types such as mixers having two rotating curved blades may be used, while the equipment may be constructed from stainless steel or from other metals plated with platinum or gold or other corrosion resistant materials or even from these materials themselves. The practice of the invention therefore does not require the employment of specially constructed apparatus and so may be readily utilized in a commercial way.

We have found that the purity of the product depends to a certain extent upon the purity of the metaphosphoric acid for if the latter contains considerable quantities of dehydration products such as $P_2O_5$, the monofluorophosphoric acid may contain a few per cent. of other phosphorus-fluorine compounds.

The product of our invention, to wit, anhydrous monofluorophosphoric acid ($H_2PO_3F$) is of value for the synthesis of various organic materials useful as insecticides, or as a catalyst and for other purposes in the arts, and it is therefore our belief that the acid which in consequence of our invention is now available will have numerous and important applications and that the invention marks a distinct and valuable contribution to industry.

It will consequently be apparent that our invention comprehends not only a novel composition of matter which has never been isolated or existed in a free state, so far as we are aware, but also a novel method of treatment of suitably selected reagents for the production of the said composition.

We therefore claim and desire to protect by Letters Patent of the United States:

1. The method of producing anhydrous monofluorophosphoric acid which comprises mixing anhydrous hydrofluoric acid and water-free metaphosphoric acid substantially in stoichiometrically equivalent quantities according to the equation $HPO_3 + HF = H_2PO_3F$.

2. The method of producing anhydrous monofluorophosphoric acid which comprises mixing water-free metaphosphoric acid with a slight excess of anhydrous hydrofluoric acid and removing volatile matter by evaporation.

3. The method of producing anhydrous monofluorophosphoric acid which comprises mixing anhydrous hydrofluoric acid with an excess of water-free metaphosphoric acid and separating the product from the unreacted metaphosphoric acid.

4. As a new article of manufacture, anhydrous monofluorophosphoric acid having the formula $H_2PO_3F$, being a clear, oily liquid substantially colorless and odorless and containing about 31% P and about 19% F.

5. As a new article of manufacture, anhydrous monofluorophosphoric acid having the formula $H_2PO_3F$, being a clear, oily liquid substantially colorless and odorless, of a density of about 1.82 at 25° C. and containing about 31% P and about 19% F.

6. The method of producing anhydrous monofluorophosphoric acid which comprises mixing anhydrous hydrofluoric acid and water-free metaphosphoric acid in a closed vessel and preventing the loss of HF until the reaction has gone to completion according to the equation $$HPO_3 + HF = H_2PO_3F$$

WILLY LANGE.
RALPH LIVINGSTON.